United States Patent
Valpey, III et al.

(10) Patent No.: US 11,566,140 B2
(45) Date of Patent: Jan. 31, 2023

(54) EXTERIOR COATING COMPOSITION

(71) Applicant: Troy Corporation, Florham Park, NJ (US)

(72) Inventors: Richard S. Valpey, III, Rockaway, NJ (US); Jake Jacobs, Florham Park, NJ (US)

(73) Assignee: Troy Corporation, Florham Park, NJ (US)

( * ) Notice: Subject to any disclaimer, the term of this patent is extended or adjusted under 35 U.S.C. 154(b) by 160 days.

(21) Appl. No.: 16/886,174

(22) Filed: May 28, 2020

(65) Prior Publication Data

US 2020/0377738 A1 Dec. 3, 2020

Related U.S. Application Data

(60) Provisional application No. 62/855,500, filed on May 31, 2019.

(51) Int. Cl.
    *C09D 5/16*    (2006.01)
    *E04D 13/00*  (2006.01)
    *E04B 1/62*   (2006.01)

(52) U.S. Cl.
    CPC .............. *C09D 5/1625* (2013.01); *E04B 1/62* (2013.01); *E04D 13/002* (2013.01)

(58) Field of Classification Search
None
See application file for complete search history.

(56) References Cited

U.S. PATENT DOCUMENTS

| | | | | |
|---|---|---|---|---|
| 3,065,123 A | * | 11/1962 | Hinton et al. | A01N 43/80 162/161 |
| 7,585,980 B2 | * | 9/2009 | Lindner | C07F 3/003 548/209 |
| 7,888,514 B2 | | 2/2011 | Lindner | |
| 8,350,049 B2 | * | 1/2013 | Lindner | A61K 31/555 548/209 |
| 2005/0101487 A1 | * | 5/2005 | Beilfuss | A01N 43/70 504/134 |
| 2010/0075939 A1 | * | 3/2010 | Lindner | A61K 31/555 548/101 |

(Continued)

OTHER PUBLICATIONS

International Search Report and Written Opinion for International Application No. PCT/US2020/034911, dated Aug. 11, 2020, 11 pages.

(Continued)

*Primary Examiner* — Peter A Salamon
(74) *Attorney, Agent, or Firm* — Dority & Manning, P.A.

(57) ABSTRACT

A coating composition is provided for inhibiting growth of fungus and/or algae on a surface. The coating composition includes a dry film preservative and an antibacterial dry-film preservative comprising an immobilized isothiazolin-3-one derivative/zinc oxide complex. The amount of the antibacterial preservative comprising immobilized 1,2-isothiazolin-3-one derivative/zinc oxide complex and the dry film preservative contained in the coating composition is sufficient to inhibit or prevent the defacement of a surface exposed to the environment, when such defacement is due to growth of fungi or algae, or a combination of fungi and algae on a surface coated with said surface coating composition.

19 Claims, 4 Drawing Sheets

(56) References Cited

U.S. PATENT DOCUMENTS

2011/0150956 A1* 6/2011 Lindner ............... A61K 31/555
   514/184
2020/0377738 A1* 12/2020 Valpey, III ............ E04D 13/002

OTHER PUBLICATIONS

Valpey el al., "Dry Film Preservation of Roof Coatings", Troy Corporation, Nov. 2017, 10 pages.
International Preliminary Report on Patentability and Written Opinion for International Application No. PCT/US2020/034911, dated Nov. 16, 2021, 8 pages.

* cited by examiner

| Sample | Aspergillus niger |
|---|---|
| Sample 1: Blank<br>Interior Latex Revo Eggshell |  |
| Sample 2: dry film preservative only<br>Interior Latex Revo Eggshell containing 0.021% IPBC, 0.065% BCM, and 0.105% Diuron |  |
| Sample 3: bactericide only<br>Interior Latex Revo Eggshell containing 0.36% Immobilized BIT |  |

FIG. 4

| Sample | Aspergillus niger | |
|---|---|---|
| | No Bacterial Exposure | Bacterial Exposure |
| Sample 1: Blank (comparative) Interior Latex Revo Eggshell, no dry film preservative, no immobilized BIT | 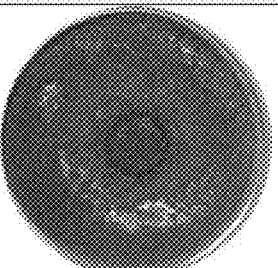 | 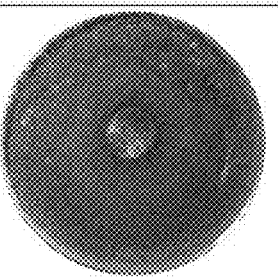 |
| Sample 2: (comparative) Interior Latex Revo Eggshell containing 0.021% IPBC, 0.065% BCM, and 0.105% Diuron | 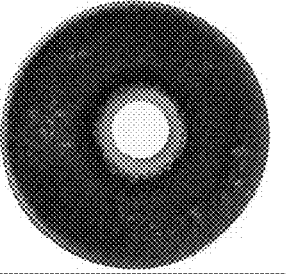 | 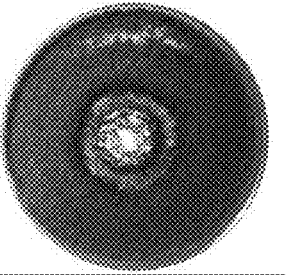 |
| Sample 3: (comparative) Interior Latex Revo Eggshell containing 0.36% Immobilized BIT | 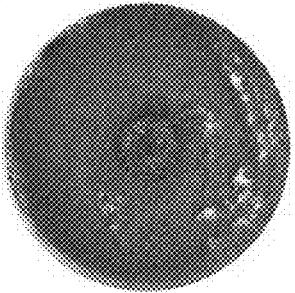 | 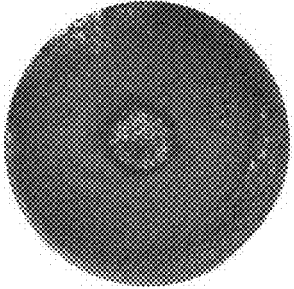 |
| Sample 4: (according to the invention) Interior Latex Revo Eggshell containing both 0.36% Immobilized BIT and 0.021% IPBC, 0.065% BCM, and 0.105% Diuron | 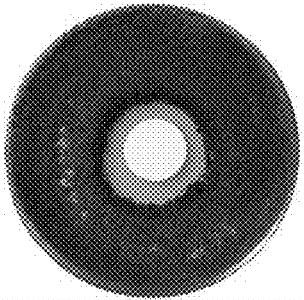 | 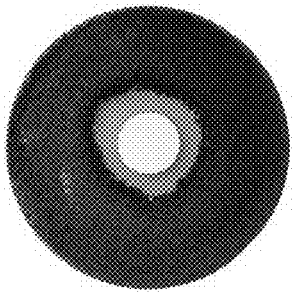 |

EXTERIOR COATING COMPOSITION

CROSS REFERENCE TO RELATED APPLICATIONS

This application claims the benefit of and priority from U.S. Provisional Application No. 62/855,500, filed on May 31, 2019, the disclosure of which is incorporated by reference herein in its entirety for all purposes.

FIELD OF THE INVENTION

Aspects of the invention are directed to coating compositions for inhibiting fungal, algal, and bacterial growth on a surface, which growth causes defacement and damage to the surface, and methods for manufacturing the same. The invention is also directed to a method of preventing defacement from exterior exposure, such exposure resulting in for example, microbial defacement, such as defacement caused by algal, fungal, bacterial growth.

BACKGROUND OF THE INVENTION

The growth of fungi and algae on exterior and interior surfaces in humid conditions and/or periods of darkness is a major concern that affects residential homes, commercial offices, and recreational environments. Such growth is not only unsightly and defaces the surfaces, but also damages these surfaces. As used herein, exterior surfaces refers to any surface of an object that may be subject to environmental conditions in nature. The coating compositions disclosed herein may also be intended for use on interior surfaces that may be subject to humid conditions and/or periods of darkness, such as a residential bathroom or basement.

Fungi (e.g., mold, mildew) is not only unsightly, but can destroy commonly used building materials, such as wood, fiber, and other materials, causing severe damage to buildings and other structures and equipment. There are between 100,000 and 200,000 species of fungi, mold and mildew, depending on the employed classification methodology. Of particular concern are the pathogenic fungi, which can cause significant adverse health effects to exposed individuals. About 300 species of fungi are presently known to be pathogenic to man, but it is thought that there are many other fungi species that are not yet recognized as pathogenic.

Fungal colonies typically take on a filamentous form, having long filament-like cells called hyphae. Under the favorable growth conditions, hyphae grow into an intertwining network called a mycelium. A mycelium can be visible to the naked eye, appearing as unsightly fuzzy green, bluish-gray or black spots, for example. When conditions for growth are less favorable, many varieties of fungi can respond by forming spores on specialized hyphal cells. Spores are the primary means for dispersal and survival of fungi, and can remain dormant for months or even years-even withstanding extremely adverse conditions, to germinate and flourish again when environmental variables, such as light, oxygen levels, temperature, and nutrient availability, become favorable again.

Fungi are considered saprophytes, i.e., fungi generally grow by decomposing organic matter to obtain nourishment. Building and decorative materials such as wood, paper-coated wallboard, wallpaper, fabrics, carpet and leather can provide the necessary organic matter for the nourishment and growth of fungi. Today, an especially problematic fungal genus that is often found on exterior surfaces of buildings is *Stachybotrys*. *Stachybotrys chartarum*, commonly found in nature growing on cellulose-rich plant materials, is frequently found in water-damaged building materials, such as ceiling tiles, wallpaper, sheet-rock, and cellulose resin wallboard (fiberboard). Depending on the particular environmental conditions—e.g., temperature, pH, and humidity—in which *Stachybotrys* is growing, mycotoxins, compounds that have toxic properties, may be produced.

Other common fungi that are typically found on exterior surfaces, such as the exterior surfaces of residential homes and commercial offices, are *Aspergillus* species sp., *Penicillium* sp., *Fusarium* sp., *Alternaria dianthicola*, *Aureobasidium pullulans* (aka *Pullularia pullulans*), *Phoma pigmentivora*, and *Cladosporium* sp. Heavy contamination of exterior surfaces by dirt and/or oil can facilitate fungal growth by providing a food source for the fungi. In addition, surfaces and materials that are difficult to access for cleaning, or for which cleaning is neglected, are particularly vulnerable to attack by fungi.

It has become increasingly apparent that exposure to certain fungi or their spores can significantly and adversely impact the health of humans, pets, and other animals. Concerns such as allergies, asthma, infections, and the long-term repercussions of mold toxins are just a few of the many adverse health effects associated with fungal contamination and/or growth.

Algal growth likewise is unsightly and over the long term can destroy the coated surface and/or the underlying substrate. Algae are members of a group of predominantly aquatic photosynthetic organisms of the kingdom Protista. The can grow on exterior surfaces and are unsightly and have the potential to destroy the exterior substrate or coating, if left unchecked. Non-limiting examples of algae that are of particular concern for exterior coatings are *Chlorella*, *Oscilatoria*, *Scnedesmus*, *Ulothrix*, *Trentepohlia*, and *Trebouxiophyceae*.

Bacteria likewise can grow on and deface exterior surfaces exposed to the environment, and like fungal and algal growth, such bacterial growth can be unsightly, but can also damage such surfaces over time. Examples of undesirable bacteria include but are not limited to *Enterobacter cloacae*, *Actinobacter* sp., *Escherichia coli*, *Staphylococcus aureus*, and *Pseudomonas aeruginosa*.

Accordingly, there is a continued need for improved methods and compositions for that have efficacy for inhibiting environmental defacement of surfaces due to bacterial, fungal and algal growth on surfaces, since environmental exposure may be assumed to contribute to defacement from all three types of microbes. Such growth not only defaces such surfaces, but also damages them.

SUMMARY OF THE INVENTION

Aspects of the invention are directed to coating compositions for inhibiting fungal, algae, and bacterial growth on a surface. The inventors discovered that coating compositions having a dry film preservative and an antibacterial preservative comprising an immobilized isothiazolin-3-one derivative/zinc oxide complex provided synergistic effects that inhibit the growth of fungi, and/or algae and/or bacteria on surfaces, even though it is well-known in the art that the immobilized isothiazolin-3-one derivative/zinc oxide complex is not effective as a dry-film preservative against fungi. For example, it was unexpectedly discovered that the combination of immobilized 1,2-benzisothiazolin-3(2H)-one/ zinc oxide complex and a dry film preservative provides superior protection on exterior surfaces compared to a dry film preservative alone or immobilized 1,2-benzisothiazolin-3(2H)-one/zinc oxide complex alone. This synergy was unexpected because neither is particularly effective alone, but used together, these compounds shown a surprising efficacy against defacement in exterior exposure studies. As disclosed herein, exterior exposure studies were conducted that demonstrate that the combination functions well in the environment, which can be assumed to contain fungi, algae, and bacteria. While dry film preservatives were known to somewhat reduce the level of fungi and algae on substrates, immobilized isothiazolin-3-one/zinc oxide complex, i.e. 1,2-benzisothiazolin-3(2H)-one ("BIT") complexed with zinc oxide, as described in U.S. Pat. No. 8,350,049 B2, the contents of which are incorporated herein for all purposes, is conventionally thought to only reduce the level of bacteria, not to also reduce the level of fungi or algae on a substrate. It is generally accepted that immobilized isothiazolin-3-one, e.g. immobilized 1,2-benzisothiazolin-3(2H)-one/zinc oxide complexes as well as BIT that has not been immobilized (also referred to as "free BIT") are ineffective at inhibiting the growth of fungi and algae on an exterior surface, either together or in combination. Moreover, control of bacterial growth on a dry film is not considered to be an important endpoint in the industry for long-lasting mildew (i.e. fungal) and algal resistance. Thus, combining a bactericide such as an immobilized isothiazolin-3-one derivative/zinc oxide complex with a dry film preservative would not be expected to significantly improve the performance of the dry film preservative with respect to reducing the level of fungi and algae on a surface. However, as further disclosed below, coating compositions having a dry film preservative and an antibacterial preservative that is effective in the dry-film, including an immobilized isothiazolin-3-one derivative/zinc oxide complex, (e.g. immobilized 1,2-benzisothiazolin-(2H)-one/zinc oxide complex) provided synergistic effects that resulted in superior capabilities of inhibiting the growth of fungi, algae, and bacteria.

In accordance with one aspect of the invention, a coating composition is provided for inhibiting growth of fungus and algae on a surface. The coating composition includes a dry film preservative and an antibacterial preservative comprising an immobilized isothiazolin-3-one derivative/zinc oxide complex. The amount of the antibacterial preservative and the dry film preservative contained in the coating composition is sufficient to inhibit or prevent the growth of any or all of fungi, algae, and bacteria on a surface coated with said surface coating composition after said coating has dried.

According to another aspect of the invention, an exterior paint composition is provided for inhibiting growth of fungus, algae, and bacteria on an exterior surface. The exterior paint composition includes a dry film preservative and an antibacterial preservative. The antibacterial preservative includes an immobilized isothiazolin-3-one derivative/zinc oxide complex. The amount of the dry film preservative and the amount of antibacterial preservative is sufficient to inhibit or prevent the growth of fungi, algae, and bacteria on an exterior surface coated with said exterior paint composition.

In accordance with an aspect of the invention, suitable dry film preservatives include, but are not limited to 3-iodoprop-2-yn-1-yl butylcarbamate (IPBC); methylbenzimidazole-2-yl carbamate (BCM); 3-(3,4-dichlorphenyl)-1,1-dimethylurea (Diuron); 2-tert-butylamino-4-ethylamino-6-methylthio-1,3,5-triazin (Terbutryn); 3-(4-isopropylphenyl)-1,1-dimethylurea (Isoproturon); zinc pyrithione (ZPT); 2-octyl-2H-isothiazol-3-one (OIT); 4,5-dichloro-2-octyl-4-isothiazolin-3-one (DCOIT); 2-(tert-butylamino)-4-(cyclopropylamino)-6-(methylthio)-s-triazine (Irgarol); N-tert-butyl-6-chloro-N'-ethyl-1,3,5-triazine-2,4-diamine (Terbuthylazine); and mixtures thereof.

In accordance with a further aspect of the invention, a wood coating composition is provided for inhibiting growth of fungus, algae, and bacteria on a wood surface. The wood coating composition includes a dry film preservative and antibacterial preservative, the antibacterial preservative comprising immobilized isothiazolin-3-one/zinc oxide complex. The amount of the dry film preservative and the amount of antibacterial preservative is sufficient to inhibit or prevent the growth of fungi, algae, and bacteria on a surface coated with said wood coating composition, thereby preventing the defacement of such surfaces.

According to yet another aspect of the invention, a leather coating composition is provided for inhibiting growth of fungus, algae, and bacteria on a leather surface. The leather coating composition including a dry film preservative and an antibacterial preservative. The antibacterial preservative includes an immobilized isothiazolin-3-one/zinc oxide complex. The amount of the dry film preservative and the amount of antibacterial preservative is sufficient to inhibit or prevent the growth of fungi, algae, and bacteria on a surface coated with said leather coating composition, thereby preventing the defacement of such surfaces.

According to yet a further aspect of the invention, a method is provided for enhancing resistance to fungi, algae, and bacteria by inhibiting microbial growth on a surface. The method includes the steps of: combining a coating composition with a preservative composition comprising a dry film preservative and an antibacterial preservative. The antibacterial preservative comprises an immobilized isothiazolin-3-one zinc oxide complex. Additionally, the amount of the dry film preservative and the amount of antibacterial preservative comprising immobilized isothiazolin-3-one/zinc oxide complex, such as immobilized 1,2-benzisothiazolin-3(2H)one/zinc oxide complex, is sufficient to inhibit the growth of fungi, algae, and bacteria on a surface coated with the coating composition having the preservative composition.

In accordance with yet another aspect of the invention, a method is provided for producing a coating composition that inhibits the growth of fungi, algae, and bacteria on a surface of an object. The method for producing the coating composition includes the steps of: combining a coating composition with a preservative composition comprising a dry film preservative and an anti-microbial preservative, the anti-microbial preservative comprising an immobilized isothiazolin-3-one derivative/zinc oxide complex. The amount of the dry film preservative and the amount of anti-microbial preservative is sufficient to inhibit the growth of fungi, algae, and bacteria on a surface coated with the coating composition having the preservative composition.

BRIEF DESCRIPTION OF THE DRAWINGS

FIG. 4 illustrates photographs of bacteria-exposed and non-exposed specimens containing either dry film preservatives or immobilized BIT/zinc oxide complex or a combination of both, compared to a blank paint containing neither.

DETAILED DESCRIPTION OF PREFERRED EMBODIMENTS

Figure 1:
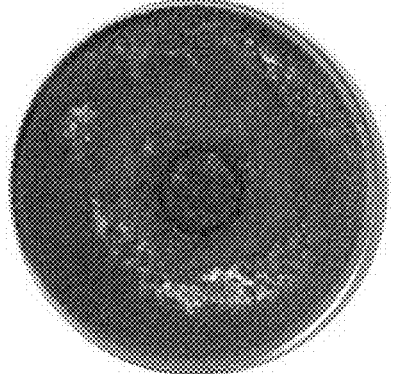
FIG. 1 illustrates photographs of painted specimens containing either 0.021% IPBC, 0.065% BCM, and 0.105% Diuron; or 0.36% immobilized BIT/zinc oxide complex compared to a blank paint containing no IPBC, BCM, Diuron, or immobilized BIT/zinc oxide complex after exposure to a fungus.
Figure 1:
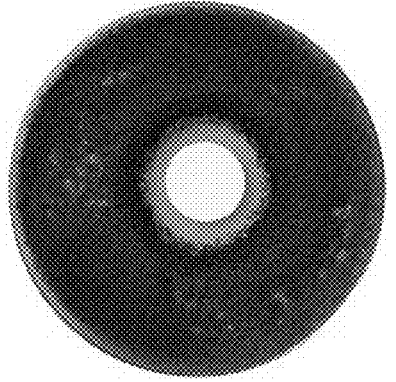
Figure 1:
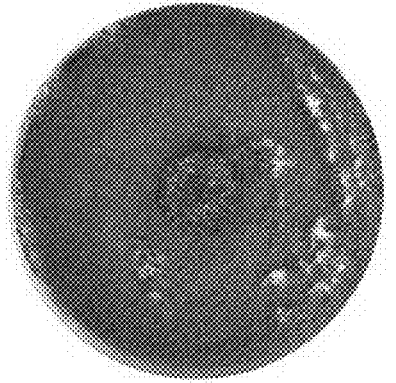

Aspects of the invention are directed to coating compositions for inhibiting fungal, algal, and bacterial growth on a surface and methods of manufacturing the same. As mentioned above, the inventors discovered that a synergistic effect of inhibiting the growth of fungi and/or algae was surprisingly achieved by coating compositions having both a dry film preservative and an antibacterial preservative effective in the dry-film, specifically an immobilized isothiazolin-3-one derivative/zinc oxide complex. The immobilized isothiazolin-3-one derivative/zinc oxide complex may be an immobilized benzisothiazolin-3(2H)-one/zinc oxide complex. The coating compositions disclosed herein may enhance the efficacy of inhibiting the growth of fungi, and algae for current products, such as paints and roof coatings. Additional advantages of the coating compositions disclosed herein include: (i) good persistence in the dried coating, even when subjected to potent leaching conditions and exposure to UV light, high temperatures, extreme weather conditions and climatic conditions, and conditions of changing weather; (ii) biocidal long-term action in the dried coating film despite low concentration of the biocide composition employed; (iii) low toxicity to humans and mammals; (iv) very low vapor pressure of the biocidal active ingredients; (v) favorable price/performance ratio.

The surprising inhibitory activity against fungi and/or algae, which is a result of the synergistic effect of the dry film preservative and the antibacterial preservative disclosed herein, is demonstrated experimentally in the appended Examples.

As used herein:
a) "preservative" refers to a material that is biologically active for inhibiting the growth of certain microorganisms, such as bacteria, algae and/or fungi (including mildew and yeast);
b) "dry film preservative" refers to a material that is biologically active for inhibiting the growth of certain microorganisms, such as bacteria, algae and/or fungi (including mildew and yeast) in or on a dried film or coating and/or the substrate to which the coating is applied. A non-limiting example of such a dried film is dried paint. This is to distinguish from an "in-can" preservative which is biologically active to prevent the growth of undesired microorganisms in the aqueous phase of a coating product, for instance a can of paint, prior to being applied to a substrate and subsequently allowed to dry.
c) "antibacterial" refers to a material that is biologically active for inhibiting the growth of certain bacteria in a dried film;
d) "anti-algal" refers to a material that is biologically active for inhibiting the growth of certain algae in a dried film;
e) "antifungal" or "anti-fungal" refers to a material that is biologically active for inhibiting the growth of certain fungi (including mildew and yeast) in a dried film;
f) "Microbe" means a unicellular life form;
g) "deface" or "defacement" means to mar the appearance of a surface: injure by effacing significant details of a surface;
h) "Minimum Inhibitory Concentration" or "MIC" refers to the minimum concentration necessary to inhibit the growth of a microbe under standardized test conditions.
i) "mastic" means an adhesive used in the construction industry for use on porcelain, glass, or ceramic tile. Older tile mastics were derived from the resin of the *Pistacia lentiscus* tree. Today, many mastics are asphalt-based organic materials or inorganic acrylic copolymers mixed with calcium carbonate.
j) "includes" means comprises but is not limited to.
k) "excludes" means that some amount present may be present as an impurity but no more than the minimum level consistent with present good manufacturing practices.
l) For avoidance of doubt, the following trade names are used herein, along with their common chemical names as are known and used by those skilled in the art, and their IUPAC names:

| IUPAC name | Common chemical name | Trade name |
| --- | --- | --- |
| 3-iodoprop-2-ynyl N-butylcarbamate | 3-iodoprop-2-yn-1-yl butylcarbamate | IPBC |
| methyl N-(1H-benzimidazol-2-yl)carbamate | methylbenzimidazole-2-yl carbamate | BCM |
| 3-(3,4-dichlorophenyl)-1,1-dimethylurea | 3-(3,4-dichlorphenyl)-1,1-dimethylurea | Diuron |
| 2-N-tert-butyl-4-N-ethyl-6-methylsulfanyl-1,3,5-triazine-2,4-diamine | 2-tert-butylamino-4-ethylamino-6-methylthio-1,3,5-triazin | Terbutryn |
| 1,1-dimethyl-3-(4-propan-2-ylphenyl)urea | 3-(4-isopropylphenyl)-1,1-dimethylurea | Isoproturon |
| zinc; 1-oxidopyridin-1-ium-2-thiolate | zinc pyrithione | ZPT |
| 2-octyl-1,2-thiazol-3-one | 2-octyl-2H-isothiazol-3-one | OIT |
| 4,5-dichloro-2-octyl-1,2-thiazol-3-one | 4,5-dichloro-2-octyl-4-isothiazolin-3-one | DCOIT |
| 2-N-tert-butyl-4-N-cyclopropyl-6-methylsulfanyl-1,3,5-triazine-2,4-diamine | 2-(tert-butylamino)-4-(cyclopropylamino)-6-(methylthio)-s-triazine | Irgarol |
| 2-N-tert-butyl-6-chloro-4-N-ethyl-1,3,5-triazine-2,4-diamine | N-tert-butyl-6-chloro-N'-ethyl-1,3,5-triazine-2,4-diamine | Terbuthylazine |
| 1,2-benzothiazol-3-one | 1,2-benzisothiazolin-3(2H)-one or 1,2-benzisothiazolin-3-one | BIT |
| 2-butyl-1,2-benzothiazol-3-one | N-(n-butyl)-1,2-benzisothiazolin-3-one | BBIT |
| 5-chloro-2-methyl-1,2-thiazol-3-one | 5-chloro-2-methyl-4-isothiazolin-3-one | CMIT |
| 2-methyl-1,2-thiazol-3-one | 2-methyl-4-isothiazolin-3-one | MIT |

According to one aspect of the invention, a surface coating composition for inhibiting the growth of a fungi, algae, and bacteria or any combination thereof on a surface includes a dry film preservative and an antibacterial preservative effective in the dried film comprising an immobilized 1,2-benzisothiazolin-3-one/zinc oxide complex. The isothiazolin-3-one derivative compound and a zinc oxide of the antibacterial preservative may form a complex and/or bond by way of ionic bonding, covalent bonding, and/or polar bonding. In one embodiment, the antibacterial preservative comprises an immobilized preservative, such as immobilized isothiazolin-3-one derivative/zinc oxide complex, such as immobilized 1,2-benzisothiazolin-3(2H)-one (BIT)/zinc oxide complex. Suitable immobilized 1,2-benzisothiazolin-3(2H)-one/zinc oxide complexes for use in the present invention are described in U.S. Pat. Nos. 8,350,049, 7,888,514, and 7,585,980, which are incorporated herein by reference in their entirety for all purposes.

As described herein, the "immobilized isothiazolin-3-one derivative/zinc oxide complex" may be obtained based on the fact that isothiazolin-3-one derivatives such as BIT are soluble in methanol at greater than 5%, i.e., 5 grams of pure BIT will be completely soluble in 100 ml of methanol. A solid immobilized isothiazolin-3-one derivative/zinc oxide complex (such as BIT/ZnO complex) made in accordance with the procedure described in U.S. Pat. No. 8,350,049 B2 is shaken at ambient (room) temperature with twenty (20) times its weight of methanol, any isothiazolin-3-one derivative (such as BIT) that goes into solution, i.e. does not remain attached to the zinc oxide, is defined as "free" or "not immobilized" isothiazolin-3-one derivative (e.g. BIT) while the isothiazolin-3-one derivative (e.g., BIT) that remains attached to the zinc oxide as part of the solid, undissolved isothiazolin-3-one derivative/zinc oxide complex is an embodiment of the "immobilized isothiazolin-3-one derivative/zinc oxide complex" (e.g., "immobilized BIT/zinc oxide complex") of the present invention.

The composition disclosed herein that is effective to prevent surface defacement due to environmental exposure may be a combination of a bactericide and a dry film preservative. The bactericide may be an isothiazolin-3-one derivative and zinc oxide, or a complex of an isothiazolin-3-one derivative and zinc oxide, or mixtures thereof.

The bactericide may be an immobilized isothiazolin-3-one derivative/zinc oxide complex, such as immobilized BIT/zinc oxide complex, also referred to herein as immobilized 1,2-benzisothiazolin-3-one/zinc oxide complex, together with a dry film preservative. For example, the dry film preservative may be selected from the group consisting of 3-iodoprop-2-yn-1-yl butylcarbamate (IPBC); methyl-benzimidazole-2-yl carbamate (BCM); 3-(3,4-dichlorphenyl)-1,1-dimethylurea (Diuron); 2-tert-butylamino-4-ethyl-amino-6-methylthio-1,3,5-triazin (Terbutryn); 3-(4-isopropylphenyl)-1,1-dimethylurea (Isoproturon); zinc pyrithione (ZPT); 2-(tert-butylamino)-4-(cyclopropylamino)-6-(methylthio)-s-triazine (Irgarol); N-tert-butyl-6-chloro-N'-ethyl-1,3,5-triazine-2,4-diamine (Terbuthylazine); and mixtures thereof.

A coating composition comprising the composition disclosed herein that is effective to prevent surface defacement due to environmental exposure may have a total mass of immobilized isothiazolin-3-one derivative/zinc oxide complex such as immobilized 1,2-benzisothiazolin-3(2H)-one/zinc oxide complex of about 0.001% to 10% weight percent of the coating composition, or 0.005% to 5% or 0.005% to 0.1% weight percent, or 0.005% to 0.5% weight percent, or 0.01% to 2% weight percent, or 0.01% to 0.15% weight percent. In an embodiment, the coating composition comprising the composition disclosed herein that is effective to prevent surface defacement due to environmental exposure may have a total mass of immobilized isothiazolin-3-one derivative/zinc oxide complex such as immobilized 1,2-benzisothiazolin-3(2H)-one compound/zinc oxide complex of about 0.001 wt %, 0.005 wt %, 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.5 wt %, 2.0 wt %, 2.5 wt %, 3.0 wt %, 3.5 wt %, 4.0 wt %, 4.5 wt %, 5.0 wt %, 5.5 wt %, 6.0 wt %, 6.5 wt %, 7.0 wt %, 7.5 wt %, 8.0 wt %, 8.5 wt %, 9.0 wt %, 9.5 wt %, 10.0 wt % of the coating composition. In one embodiment, the total mass of immobilized isothiazolin-3-one derivative/zinc oxide complex may be provided as a concentrate that is then added to the coating composition. The total mass of immobilized isothiazolin-3-one derivative/zinc oxide complex may comprise 1% to 90 weight % of the concentrate, or 2% to 30 weight % of the concentrate, or 5% to 15 weight percent of the concentrate or 7% to 12 weight % of the concentrate or 10 weight % of the concentrate or up to 100% of the concentrate. Within the immobilized isothiazolin-3-one derivative/zinc oxide complex, the mass ratio of zinc oxide compound to isothiazolin-3-one derivative (e.g. benzisothiazolinone such as BIT) may range from about 0.0.01:1 to about 100:1, from about 0.1:1 to about 10:1, or from about 0.3:1 to about 3:1. For example, in the complex, the mass ratio of isothiazolin-3-one derivative (e.g. benzisothiazolinone such as BIT) compound to zinc oxide may range from 0.01 to 100, more preferably from 0.1 to 10, or more preferably from 0.3 to 3. Additional descriptions of immobilized isothiazolin-3-one derivatives (e.g. benzisothiazolinone such as BIT)/zinc oxide complex are found in U.S. Pat. Nos. 7,585,980; 7,888,514; and 8,350,049, which are incorporated herein in their entirety for all purposes.

Additionally, a coating composition comprising the immobilized isothiazolin-3-one derivative (e.g. benzisothiazolinone such as BIT)/zinc oxide complex together with at least one dry film preservative useful against fungus and/or algae may optionally also include one or more of the following biocidal active ingredients: triazoles such as amitrol, azocyclotin, BASF 480P, bitertanol, difenoconazol, fenbuconazol, fenchlorazol, fenethanil, fluquinconazol, flusilazol, flutriafol, imibenconazole, isozofos, myclobutanil, metconazole, epoxyconazole, paclobutrazole, penconazole, propioconazole, (±)-cis-1-(4-chlorophenyl)-2-(1H-1,2,4-triazol-1-yl)cycloheptanol, tetraconazole, triadimefon, triadimenol, triapenthenol, triflumizol, triconazole and uniconazole, and the metal salts and acid adducts of these triazoles; imidazoles, such as imazalil, pefurazoat, prochloraz, triflumizol and 2-(1-t-butyl)-1-(2-chlorophenyl)-3-(1,2,4-triazo-1-yl)propan-2-ol, and the metal salts and acid adducts of these imidazoles; thiazolecarboxanilides, such as 2',6'-dibromo-2-methyl-4-trifluoromethoxy-4'-trifluoromethyl-1,3-thiazole-5carboxanilide, and the metal salts and acid adducts of these thiazolecarboxanilides; methyl (E)-2-{2-[6-(2-cyanophenoxy)pyrimidin-4-yloxy]-phenyl}-3-methoxyacrylate, methyl (E)-2-{2-[6-(2-thioamidophenoxy) pyrimidin-4-yloxy]phenyl}-3-methoxyacrylate, methyl (E)-2-{2-[6-(2-fluorophenoxy)pyrimidin-4-yloxy]phenyl}-3-methoxyacrylate, methyl (E)-2-{2-[6-(2,6-difluorophenoxy) pyrimidin-4-yloxy]phenyl}-3-methoxyacrylate, methyl (E)-2-{2-[3-(pyrimidin-2-yloxy)phenoxy]phenyl}-3-methoxyacrylate, methyl (E)-2-{2-[3-(5-methylpyrimidin-2-yloxy)-phenoxy]phenyl}-3-methoxyacrylate, methyl (E)-2-{2-[3-(phenylsulfonyloxy)phenoxy]phenyl}-3-methoxyacrylate, methyl (E)-2-{2-[3-(4-nitrophenoxy)phenoxy]phenyl}-3-methoxyacrylate, methyl (E)-2-(2-phenoxy)-3-methoxyacrylate, methyl (E)-2-[2-(3,5-dimethylbenzoyl)pyrrol-1-yl]-3-methoxyacrylate, methyl (E)-2-[2-(3-methoxyphenoxy)phenyl]-3,-methoxyacrylate, methyl (E)-2-[2-(2-phenylethen-1-yl)phenyl]-3-methoxyacrylate, methyl (E)-2-[2-(3,5-dichlorophenoxy) pyridin-3-yl]-3-methoxyacrylate, methyl (E)-2-{2-[3-(1,1,2,2-tetrafluoroethoxy)phenoxy]phenyl}-3-methoxyacrylate, methyl (E)-2-{2-[3-α-hydroxybenzyl) phenoxy]phenyl}-3-methoxyacrylate, methyl (E)-2-[2-(4-phenoxypyridin-2-yloxy)phenyl]-3-methoxyacrylate, methyl (E)-2-[2-(3-n-propyloxyphenoxy)phenyl]-3-methoxyacrylate, methyl (E)-2-[2-(3-isopropyloxyphenoxy)phenyl]-3-methoxyacrylate, methyl (E)-2-{2-[3-(2-fluorophenoxy)phenoxy]phenyl}-3- methoxyacrylate, methyl (E)-2-[2-(3-ethoxyphenoxy)phenyl]-3-methoxyacrylate, methyl (E)-2-[2-(4-t-butylpyridin-2-yloxy)phenyl]-3-methoxyacrylate, methyl (E)-2-{2-[3-(3-cyanophenoxy) phenoxy]phenyl}-3-methoxyacrylate, methyl (E)-2-[2-(3-methylpyridin-2-yloxymethyl)phenyl]-3-methoxyacrylate, methyl (E)-2-{2-[6-(2-methylphenoxy)pyrimidin-4-yloxy]phenyl}-3-methoxyacrylate, methyl (E)-2-[2-(5-bromopyridin-2-yloxymethyl)phenyl]-3-methoxyacrylate, methyl (E)-2-{2-[3-(3-iodopyridin-2-yloxy)phenoxy]phenyl}-3-methoxyacrylate, methyl (E)-2-{2-[6-(2-chloropyridin-3-yloxy)pyrimidin-4-yloxy]phenyl}-3-methoxyacrylate, methyl (E,E)-2-[2-[5,6-dimethylpyrazin-2-ylmethyloximinomethyl)phenyl]-3-methoxyacrylate, methyl (E)-2-{2-[6-(6-methylpyridin-2-yloxy)pyrimidin-4-yloxy]phenyl}-3-methoxyacrylate, methyl (E,E)-2-{2-[(3-methoxyphenyl) methyloximinomethyl]phenyl}-3-methoxyacrylate, methyl (E)-2-{2-[6-(2-azidophenoxy)pyrimidin-4-yloxy]phenyl}-3-methoxyacrylate, methyl (E,E)-2-{2-[6-(phenylpyrimidin-4-yl)methyloximinomethyl]phenyl}-3-methoxyacrylate, methyl (E,E)-2-{2-[(4-chlorophenyl)methyloximinomethyl]phenyl}-3-methoxyacrylate, methyl (E)-2-{2-[6-(2-n-propylphenoxy)-1,3,5-triazin-4-yloxy]phenyl}-3-methoxyacrylate, methyl (E,E)-2-{2-[(3-nitrophenyl)methyloximinomethyl]phenyl}-3-methoxyacrylate; succinate dehydrogenase inhibitors such as fenfuram, furcarbanil, cyclafluramid, furmecyclox, Seedvax, Metsulfovax, pyrocarbolid, oxycarboxin, Shirlan, mebenil (mepronil), benodanil and flutolanil (Moncut); naphthalene derivatives such as terbinafin, naftifin, butenafin, 3-chloro-7-(2-aza-2,7,7-trimethyloct-3-en-5-ine); sulfenamides, such as dichlorofluanid, tolylfluanid, folpet and fluorfolpet; captan, captofol; benzimidazoles, such as carbendazim, benomyl, furathiocarb, fuberidazole, thiophanate-methyl and thiabendazole and their salts; morpholin derivatives such as tridemorph, fenpropimorph, falimorph, dimethomorph, dodemorph, allimorph and fenpropidin, and their salts with arylsulfonic acids, for example with p-toluenesulfonic acid and p-dodecylphenylsulfonic acid; dithiocarbamates, cufraneb, ferbam, mancopper, mancozeb, maneb, metam, metiram, thiramzeneb, ziram; benzothiazoles, such as 2-mercaptobenzothiazole; benzamides, such as 2,6-dichloro-N-(4-trifluoromethylbenzyl)benzamide; boron compounds, such as boric acid, borates and borax; formaldehyde and formaldehyde donor compounds, such as benzyl alcohol mono(poly)hemiformal, oxazolidins, hexahydro-S-triazines, N-methylolchloroacetamide, paraformaldehyde, nitropyrine, oxolinic acid, tecloftalam; biguanides, such as polyhexamethylene biguanide; tris-N-(cyclohexyldiazeniumdioxy)aluminum, N-(cyclohexyldiazeniumdioxy)tributyltin and potassium salts thereof, bis-N-(cyclohexyldiazeniumdioxy)copper; N-methylisothiazolin-3-one, 5-chloro-N-methylisothiazolin-3-one, 4,5-trimethyleneisothiazolinone, 1,2-benzoisothiazolinone, N-methylolchloroacetamide; aldehydes, such as cinnamaldehyde, glutaraldehyde and β-bromocinnamaldehyde; thiocyanates, such as thiocyanatomethylthiobenzothiazole and methylenebisthiocyanate; quaternary ammonium compounds, such as benzyldimethyltetradecylammonium chloride, benzyldimethyldodecylammonium chloride and didecyldimethylammonium chloride; iodine derivatives, such as diiodomethyl p-tolyl sulfone, 3-iodo-2-propynyl alcohol, 4-chlorophenyl-3-iodopropargyl formal, 3-bromo-2,3-diiodo-2-propenyl ethylcarbamate, 2,3,3-triiodoallyl alcohol, 3-bromo-2,3-diiodo-2-propenyl alcohol; phenol derivatives, such as tribromophenol, tetrachlorophenol, 3-methyl-4-chlorophenol, 3,5-dimethyl-4-chlorophenol, phenoxyethanol, dichlorophen, o-phenylphenol, m-phenylphenol, p-phenylphenol and 2-benzyl-4-chlorophenol, and the alkali and alkaline earth metal salts of these phenol derivatives; microbicides with an activated halogen atom, such as chloroacetamide, bronopol and bronidox; Tectamers, such as 2-bromo-2-nitro-1,3-propanediol, 2-bromo-4'-hydroxyacetophenone, 2,2-dibromo-3-nitrilepropionamide, 1,2-dibromo-2,4-dicyanobutane and β-bromo-β-nitrostyrene; tetrachloro-4-methylsulfonylpyridine, pyrimethanol, mepanipyrim, dipyrithione; metal soaps such as tin, copper and zinc naphthenate, tin, copper and zinc octoate, tin, copper and zinc 2-ethylhexanoate, tin, copper and zinc oleate, tin, copper and zinc phosphate and tin, copper and zinc benzoate; metal salts such as copper hydroxycarbonate, sodium dichromate, potassium dichromate, potassium chromate, copper sulfate, copper chloride, copper borate, zinc fluorosilicate, copper fluorosilicate; oxides such as tributyltin oxide, $Cu_2O$, CuO, ZnO; dialkyldithiocarbamates, such as sodium and zinc salts of dialkyldithiocarbamates, tetramethylthiuram disulfide and potassium N-methyldithiocarbamate; nitriles such as 2,4,5,6-tetrachloroisophthalodinitrile, disodium cyanodithioimidocarbamate; quinolines, such as 8-hydroxyquinoline and its copper salts; mucochloric acid, 5-hydroxy-2-(5H)-furanone; 4,5-dichlorodithiazolinone, 4,5-benzodithiazolinone, 4,5-trimethylenedithiazolinone; 4,5-dichloro-(3H)-1,2-dithiol-3-one, 3,5-dimethyltetrahydro-1,3,5-thiadiazine-2-thione, N-(2-p-chlorobenzoylethyl)hexaminium chloride, potassium N-hydroxymethyl-N'-methyldithiocarbamate; 2-oxo-2-(4-hydroxyphenyl)acetohydroximinoyl chloride; phenyl 2-chlorocyanovinyl sulfone, phenyl 1,2-dichloro-2-cyanovinyl sulfone; silver-, zinc- or copper-containing zeolites, alone or enclosed in polymeric active constituents; algaecides such as copper sulfate, dichlorophen, endothal, fentin acetate and quinoclamin; and herbicides such as acetochlor, acifluorfen, aclonifen, acrolein, alachlor, alloxydim, ametryn, amidosulfuron, amitrol, ammonium sulfate, anilofos, asulam, atrazine, aziprotryn, benazolin, benfluralin, benfuresate, bensulfuron, bensulide, benztazone, chloridazon, chlorimuron, chloromethoxyfen, chloronitrofen, chloroacetic acid, chloropicrin, chlorotoluron, chloroxuron, chloroprepham, chlorosulfuron, chlorothal, chlorothiamide, cinmethyline, cinosulfuron, clethodim, clomazone, clomeprop, clopyralid, cyanamide, cyanazine, cycloate, cycloxydim, benzofencap, benzthiazuron, bifenox, bilanafos, borax, bromacil, bromobutide, bromofenoxim, bromoxynil, butachlor, butamifos, butanachlor, butralin, butylate, carbetamide, CGA 184927, chloramben, chlorobromuron, chlorobufam, chloroflurenol, difenoxuron, difenzoquat, diflufenican, dimefuron, dimepiperate, dimethachlor, dimethametryn, dimethipin, dimethylarsenic acid, dinitramin, dinoseb acetate, dinoseb, dinoterb, diphenamide, dipropetryn, diquat, dithiopyr, diuron, DNOC, PPX-A788, 2,4-D, daimuron, dalapon, dazomet, 2,4-DB, desmedipham, desmetryn, dicamba, dichlobenil, dichloroprop, dichloroprop-P, diclofop, diethatyl, flamprop-M, flazasulfuron, fluazifop, fluazifop-P, fluchloralin, flumeturon, fluoroglycofen, fluoronitrofen, flupropanate, flurenol, fluridon, fluorochloridon, fluroxypyr, fomesafen, fusamin, furyloxyfen, glufosinate, glyphosate, haloxyfop, hexazinon, imazamethabenz, imazapyr, imazaquin, imazethapyr, ioxynil, isopropalin, isouron, isoxaben, isoxapyrifop, lactofen, lenacil, linuron, LS830556, MCPA, pebulat, pendimethalin, pentachlorophenol, pentanochlor, mineral oil fractions, phenmedipham, picloram, piperophos, pretilachlor, primisulfuron, prodiamin, proglinazin, prometon, prometryn, propachlor, propanil, propaquizafop, propazir, propham, propyzamide, prosulfocarb, pyrazolynate, pyrazosulfuron, pyrazoxyfen, pyributicarb, pyridat, quinclorac, quinmerac, quinoclamin, quizalofop, quizalofop-P, S-23121, DPX-E96361, DSMA, eglinazine, endothal, epsorcarb, EPTC, ethalfluralin, ethidimuron, ethofumesate, fenoxaprop, fenoxaprop-P, fenuron, flamprop, irgarol 1051, MCPA-thioethyl, MCPB, mecoprop, mecoprop-P, mefenacet, mefluidid, metam, metamitron, metazachlor, methabenzthiazuron, methazole, methoprotryn, methyldymron, methyl isothiocyanate, metobromuron, metolachlor, metoxuron, metribuzin, metsulfuron, molinate, monoalid, monolinuron, MSMA, naproanilide, napropamide, naptalam, neburon, nicosulfuron, nipyraclofen, norflurazon, orbencarb, oryzalin, oxadiazon, oxyfluorfeno, paraquat, prometryn, simetryn, SMY 1500, sodium chlorate, sulfometuron, tar oils, TCA, tebutam, tebuthiuron, terbacil, terbumeton, terbuthylazine, thiazafluron, thifensulfuron, thiobencarb, thiocarbazil, tioclorim, tralkoxydim, tri-allate, triasulfuron, tribenzuron, triclopyr, tridiphane, trietazine, trifluralin, UB1-C4874, and vernolate.

The surface coating composition includes an amount of antibacterial preservative, i.e., an immobilized isothiazolin-3-one derivative/zinc oxide complex and an amount of dry film preservative that functions together to prevent defacement of a surface coated with the coating composition in an exterior environment. The environment may be assumed to contain microbes. Microbes may encompass any or all or a combination of some of fungi, algae, and bacteria. Thus the coating composition includes an amount of antibacterial preservative, i.e., an immobilized isothiazolin-3-one derivative/zinc oxide complex and an amount of dry film preservative that is sufficient to inhibit or prevent the growth of fungi, and/or algae and/or bacteria on a surface coated with said surface coating composition.

As used herein, the amount of dry film preservative and antibacterial preservative sufficient to prevent defacement of surfaces due to environmental exposure by inhibiting the growth of microbes such as to inhibit the growth of fungi, or algae or bacteria or any combination of fungi, algae or bacteria, is at least the amount to produce the Minimum Inhibitory Concentration. The coating composition may, however, include an amount of dry film preservative and antibacterial preservative that is 10% or more than the amount to produce the Minimum Inhibitory Concentration. For example, the coating composition may include an amount of dry film preservative and antibacterial preservative that is 25% or more, 50% or more, 75% or more, or 100% or more than the amount of dry film preservative and antibacterial preservative necessary to produce the Minimum Inhibitory Concentration. In one embodiment, the amount of immobilized isothiazolin-3-one derivative/zinc oxide complex such as immobilized 1,2-benzisothiazol-3 (2H)-one/zinc oxide complex is 0.001% to about 10%, by weight of the coating composition prior to drying, and the amount of dry film preservative is 0.01%% to about 15%, by weight of the coating composition prior to drying. It is understood that the limits are included in these ranges. The immobilized isothiazolin-3-one derivative/zinc oxide complex such as immobilized 1,2-benzisothiazolin-3(2H)-one/zinc oxide complex may be present in a coating composition, prior to drying of said composition, at levels of 0.001 wt %, 0.005 wt %, 0.01 wt %, 0.011 wt %, 0.012 wt %, 0.013 wt %, 0.014 wt %, 0.015 wt % 0.017 wt %, 0.02 wt %, 0.025 wt %, 0.03 wt %, 0.04 wt %, 0.05 wt %, 0.075 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.5 wt %, 2.5 wt % or 5 wt % of the coating composition. The dry film preservative may be present in the coating composition, prior to drying of said composition, at levels of 0.01 wt %, 0.011 wt %, 0.012 wt %, 0.013 wt %, 0.014 wt %, 0.015 wt %, 0.016 wt %, 0.017 wt %, 0.018 wt %, 0.019 wt %, 0.02 wt %, 0.025 wt %, 0.03 wt %, 0.035 wt % 0.04 wt %, 0.05 wt %, 0.075 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.5 wt %, 2.0 wt %, 2.5 wt % 3.0 wt %, 4.0 wt %, 5 wt %, 6 wt %, 7 wt %, 8 wt %, 9 wt % or 10 wt % of the coating composition.

The weight ratio of the bactericide (i.e. the immobilized isothiazolin-3-one derivative/zinc oxide complex such as immobilized 1,2-benzisothiazolin-3(2H)-one/zinc oxide complex) to the dry film preservative may range from 1:25 to 25:1 or 1:10 to 10:1. Other non-limiting suitable weight ratio ranges are 1:24 to 24:1, 1:23 to 23:1, 1:22 to 22:1, 1:21 to 21:1, 1:20 to 20:1, 1:19 to 19:1, 1:18 to 18:1, 1:17 to 17:1, 1:16 to 16:1, 1:15 to 15:1, 1:14 to 14:1, 1:13 to 13:1, 1:12 to 12:1, 1:11 to 11:1, 1:9 to 9:1, 1:8 to 8:1, 1:7 to 7:1, 1:6 to 6:1, 1:5 to 5:1, 1:4 to 4:1, 1:3 to 3:1, 1:2 to 2:1. It is understood that the limits are included in these ranges.

The coatings of the invention may be prepared by simply mixing the antibacterial preservative (immobilized isothiazolin-3-one derivative/zinc oxide complex e.g., immobilized 1,2-benzisothiazolin-3(2H)-one ("BIT")/zinc oxide complex) and dry film preservatives into a coating, paint, stain, or other composition at or near the end of the manufacturing process. Compositions of the invention will generally be formulated by mixing or dispersing at least one immobilized isothiazolin-3-one derivative/zinc oxide complex and at least one dry film preservative effective against fungi and/or algae in a select proportion with a liquid vehicle for dissolving or suspending these active components. The liquid vehicle may additionally contain any or all of: diluents, emulsifiers, wetting agents, rheology modifiers, thickeners, and foam control agents, such as are known and commonly used in the art, depending on the particular end use of the coating composition.

It may be expedient to employ, in systems that are susceptible to microbial attack, coating compositions as discussed herein in combination with a polar or nonpolar liquid medium. In this context, this medium may, for example, already exist in the coating composition and/or in the system to be preserved. Preferred polar liquid media are water, alcohols, esters, glycols, glycol ethers, glycol esters and 2,2,4-trimethyl-1,3-pentanediol monoisobutyrate (available under the trade name "Texanol" from Eastman Chemical Company). Preferred nonpolar liquid media are aromatics, such as alkylbenzenes, for example xylene and toluene, paraffins, nonpolar esters, such as phthalates and fatty acid esters, epoxidized fatty acids and their derivatives, and silicone oils. Additionally and/or alternatively, the coating composition may include other biologically active ingredients; as well as adjuvants such as surfactants, thickeners, defoamers, pH buffering agents, and solvents can be successfully included in the coating composition. Preferably, the coating composition has a pH value in the range of from 4 to 10, in particular in the range of from 6 to 8.

Preferred use of the inventive dry-film preservative useful against fungus and/or algae disclosed herein includes but is not limited to protection from algae and/or fungus of coating compositions and/or the substrates to which they are applied. Compositions of the present invention will generally be formulated by mixing or dispersing the active ingredients including immobilized isothiazolin-3-one derivative/zinc oxide complex, of which immobilized BIT/zinc oxide complex is a non-limiting example, in a select proportion with the dry film preservative together with a liquid vehicle for dissolving or suspending the active components. The vehicle may contain on or more of: a diluent, emulsifier a wetting agents, rheology modifiers, thickeners, and foam control agents, as non-limiting examples.

Non-limiting examples of these coatings and substrates include: paints, adhesives, aqueous industrial products, leather, wood products, paper products, inks, stucco, sealants, lubricants, caulk, leather treatment, roof coating, mastic, adhesive, spackling compound, stain, concrete, ceramic, stone, brick, plastic, flexible PVC, pool liners, fabric, and fresh sawn timber. The coating compositions of the invention are particularly useful in the protection of materials that are exposed to wet environments such as roof coatings. The coating compositions are particularly efficacious against algae and/or fungus.

Various exemplary aspects of the invention may be summarized as follows:

Aspect 1: A dry-film preservative composition useful against fungus and/or algae, the composition comprising:
 a) at least one bactericide comprising an immobilized isothiazolin-3-one derivative/zinc oxide complex;
 b) at least one dry film preservative useful against fungus or useful against algae or useful against fungus and algae.

Aspect 2: The composition according to Aspect 1, wherein the immobilized isothiazolin-3-one derivative/zinc oxide complex is selected from the group consisting of: immobilized 1,2-benzisothiazolin-3(2H)-one (BIT)/zinc oxide complex; immobilized N-(n-butyl)-1,2-benzisothiazolin-3-one (BBIT)/zinc oxide complex; immobilized 2-methyl-4-isothiazolin-3-one (MIT)/zinc oxide complex; immobilized 5-chloro-2-methyl-4-isothiazolin-3-one (CMIT)/zinc oxide complex; immobilized 2-octyl-2H-isothiazol-3-one (OIT)/zinc oxide complex; immobilized 4,5-dichloro-2-octyl-4-isothiazolin-3-one (DCOIT)/zinc oxide complex; and mixtures thereof.

Aspect 3: The composition according to any of Aspects 1 and 2, wherein the dry film preservative b) is selected from the group consisting of: 3-iodoprop-2-yn-1-yl butylcarbamate (IPBC); methylbenzimidazole-2-yl carbamate (BCM); 3-(3,4-dichlorphenyl)-1,1-dimethylurea (Diuron); 2-tert-butylamino-4-ethylamino-6-methylthio-1,3,5-triazin (Terbutryn); 3-(4-isopropylphenyl)-1,1-dimethylurea (Isoproturon); zinc pyrithione (ZPT); 2-(tert-butylamino)-4-(cyclopropylamino)-6-(methylthio)-s-triazine (Irgarol); N-tert-butyl-6-chloro-N'-ethyl-1,3,5-triazine-2,4-diamine (Terbuthylazine); and mixtures thereof.

Aspect 4: The composition according any of Aspects 1-3, wherein the dry film preservative b) is selected from the group consisting of: 3-iodoprop-2-yn-1-yl butylcarbamate (IPBC); methylbenzimidazole-2-yl carbamate (BCM); 3-(3,4-dichlorphenyl)-1,1-dimethylurea (Diuron); 2-tert-butylamino-4-ethylamino-6-methylthio-1,3,5-triazin (Terbutryn); 3-(4-isopropylphenyl)-1,1-dimethylurea (Isoproturon); zinc pyrithione (ZPT); 2-octyl-2H-isothiazol-3-one (OIT); 4,5-dichloro-2-octyl-4-isothiazolin-3-one (DCOIT); 2-(tert-butylamino)-4-(cyclopropylamino)-6-(methylthio)-s-triazine (Irgarol); N-tert-butyl-6-chloro-N'-ethyl-1,3,5-triazine-2,4-diamine (Terbuthylazine); and mixtures thereof.

Aspect 5: The composition according to Aspect 1, wherein the immobilized isothiazolin-3-one derivative/zinc oxide complex is immobilized 1,2-benzisothiazolin-3(2H)-one (BIT)/zinc oxide complex.

Aspect 6: The composition according to Aspect 1, wherein the immobilized isothiazolin-3-one derivative/zinc oxide complex is immobilized 1,2-benzisothiazolin-3(2H)-one (BIT)/zinc oxide complex.

Aspect 7: The composition according to any of Aspects 2-4, wherein the immobilized isothiazolin-3-one derivative/zinc oxide complex is immobilized 1,2-benzisothiazolin-3(2H)-one (BIT)/zinc oxide complex.

Aspect 8: The composition according to any of Aspects 1-7, wherein the dry film preservative b) is selected from the group consisting of: 3-(3,4-dichlorphenyl)-1,1-dimethylurea (Diuron); 2-tert-Butylamino-4-ethylamino-6-methylthio-1,3,5-triazin (Terbutryn); 3-(4-isopropylphenyl)-1,1-dimethylurea (Isoproturon); 2-(tert-Butylamino)-4-(cyclopropylamino)-6-(methylthio)-s-triazine (Irgarol); N-tert-butyl-6-chloro-N'-ethyl-1,3,5-triazine-2,4-diamine (Terbuthylazine); and mixtures thereof.

Aspect 9: The composition according any of Aspects 1-8, wherein the dry film preservative b) is 3-(3,4-dichlorphenyl)-1,1-dimethylurea (Diuron).

Aspect 10: The composition according to any of Aspects 1-9, wherein the weight ratio of a):b) is from 1:25 to 25:1, limits inclusive.

Aspect 11: The composition according to any of Aspects 1-10, wherein the weight ratio of a):b) is from 1:4 to 4:1, limits inclusive.

Aspect 12: A coating composition comprising the composition according to any of Aspects 1-11 and a carrier.

Aspect 13: A method of protecting a substrate from defacement when exposed to an environment, wherein the method comprises the steps of:
 i) treating the substrate with the coating composition according to Aspect 12;
 ii) allowing the coating composition to harden, forming a dry film.

Aspect 14: The method according to Aspect 13, wherein the environment comprises a microbial infestation.

Aspect 15: The method according to Aspect 14, wherein the microbial infestation is selected from the group consisting of fungal growth, algal growth, bacterial growth, and combinations thereof.

Aspect 16: The method according to any of Aspects 13-15, wherein the coating composition is selected from the group consisting of paint, leather treatment, roof coating, mastic, adhesive, spackling compound, and stain.

Aspect 17: The method according to any of Aspects 13-16, wherein the substrate is selected from the group consisting of wood, fresh sawn timber, stucco, concrete, wall board, leather, ceramic, stone, brick, plastic, leather, paper, metal, flexible PVC, pool liners, and fabric.

Aspect 18: The method according to any of Aspects 13-17, wherein the substrate is an exterior surface.

Aspect 19: The method according to any of Aspects 13-18, wherein the substrate is a horizontal surface.

EXAMPLES

The following examples are presented to better communicate the invention, and are not intended to limit the invention in any way. Unless otherwise indicated, all references to parts, percentages, fractions, or proportions are based on weight % of compound or active as a proportion of the total coating (substrate) weight.

The following abbreviations and reagents are referred to herein:

BIT: 1,2-benzisothiazolin-3-one, also referred to herein as 1,2-benzisothiazolin-3(2H)-one, or as 1,2-benzothiazol-3-one BBIT: N-(n-butyl)-1,2-benzisothiazolin-3-one or 2-butyl-1,2-benzothiazol-3-one MIT: 2-methyl-4-isothiazolin-3-one or 2-methyl-1,2-thiazol-3-one CMIT: 5-chloro-2-methyl-4-isothiazolin-3-one or 5-chloro-2-methyl-1,2-thiazol-3-one OIT: 2-octyl-2H-isothiazol-3-one or 2-octyl-1,2-thiazol-3-one DCOIT: 4,5-dichloro-2-octyl-4-isothiazolin-3-one or 4,5-dichloro-2-octyl-1,2-thiazol-3-one IPBC: 3-iodoprop-2-yn-1-yl butylcarbamate or 3-iodoprop-2-ynyl N-butylcarbamate BCM: methylbenzimidazole-2-yl carbamate or methyl N-(1H-benzimidazol-2-yl)carbamate Diuron: 3-(3,4-dichlorphenyl)-1,1-dimethylurea Terbutryn: 2-tert-butylamino-4-ethylamino-6-methylthio-1,3,5-triazin or 2-N-tert-butyl-4-N-ethyl-6-methylsulfanyl-1,3,5-triazine-2,4-diamine Isoproturon: 3-(4-isopropylphenyl)-1,1-dimethylurea or 1,1-dimethyl-3-(4-propan-2-ylphenyl)urea ZPT: zinc pyrithione or zinc; 1-oxidopyridin-1-ium-2-thiolate Irgarol: 2-(tert-butylamino)-4-(cyclopropylamino)-6-(methylthio)-s-triazine or 2-N-tert-butyl-4-N-cyclopropyl-6-methylsulfanyl-1,3,5-triazine-2,4-diamine Terbuthylazine: N-tert-butyl-6-chloro-N'-ethyl-1,3,5-triazine-2,4-diamine or 2-N-tert-butyl-6-chloro-4-N-ethyl-1,3,5-triazine-2,4-diamine Polyphase® 663: (Troy Corporation): comprises 3% IPBC, 9.3% BCM, and 15% Diuron Troysan® 1050 (Troy Corporation): comprises 36% weight percent immobilized BIT/zinc oxide complex

*Aspergillus niger* purchased from American Type Culture Collection

XFO-713: Methylbenzimidazole-2-yl carbamate

ACTICIDE® MKW2: (Thor) Mixture of diuron [3-(3,4-dichlorophenyl)-1,1-dimethylurea] (15%), 3-iodo-2-propynyl butylcarbamate (10%) and 2-N-Octyl-4-isothiazolin-3-one—not immobilized (7.5%).

Example 1: Immobilized BIT/Zinc Oxide Complex Alone does not Control Fungal Growth on a Painted Surface A standard blend of dry film preservative ingredients, 0.021% IPBC, 0.065% BCM, and 0.105% Diuron was added to Interior Latex Revo Eggshell paint sold by McCormick Paints. This sample was designated Sample 2. To another sample of the same paint, 0.36% of immobilized BIT/zinc oxide complex was added. This sample was designated Sample 3. The resulting two paints were compared against the blank, designated Sample 1, which contained neither the bactericide nor the dry film preservative, as well as a sample containing both 0.36% Immobilized BIT/zinc oxide complex and 0.021% IPBC, 0.065% BCM, and 0.105% Diuron, which was designated Sample 4 and is according to the invention.

The three paints were tested in accordance with a modified version of ASTM D 5590-00. One coat of each sample was applied to both sides of Whatman #2 filter paper and air dried for 24 hours. The coating specimens were then cut into 0.75 cm (diameter) circles with a punch, placed in petri dishes containing solidified Malt Agar, and then top inoculated with 0.2 mL of a suspension of *Aspergillus niger* (purchased from American Type Culture Collection, 10801 University Boulevard, Manassas, Va. 20110, under catalog number ATCC #6275), which was spread evenly over the surface of the coating specimen and agar plate with a sterile L-spreader. Approximately $5 \times 10^5$ colony forming units of the organism were applied to the plate. The petri dishes were incubated for a period of 3 weeks at 28-30° C.

As shown in FIG. 1, both the Sample 1 (blank—neither immobilized BIT/zinc oxide complex as bactericide nor any dry film preservative) and Sample 3 containing immobilized BIT alone (1% Troysan® 1050) were completely overgrown with mold whereas Sample 2 containing dry film preservative alone was protected against mildew attack. This result demonstrates that the immobilized BIT alone is ineffective against fungi at use concentrations known to be effective against bacterial growth.

Example 2: Demonstration that Examples in Accordance with Embodiments of the Invention Controls Microbial Defacement on a Painted Surface More Effectively than Current Commercially Available Dry Film Preservatives not Comprising Immobilized BIT The following preservatives were each added to separate samples of an Elastomeric Roof Coating containing no dry film preservative:
  1% POLYPHASE® 663,
  1% ACTICIDE® MKW2,
  1% POLYPHASE® 663+1.5% TROYSAN® 1050

Figure 2:
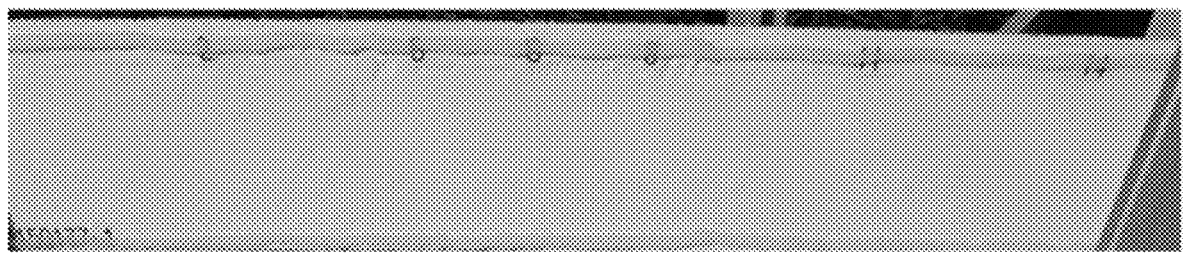
FIG. 2 illustrates a photograph of one panel of a roof coating system containing various combinations of dry film preservatives and immobilized BIT/zinc oxide complex prior to environmental exposure.

The coatings were applied over wood panels wrapped with black EPDM Rubber Roofing from GenTite. This is a standard EPDM roof coating system. A brim of caulk was applied to the edges of the coated panels to facilitate water pooling, which occurs widely with such commercial systems. A photograph of the completed roof coating with the caulk brim prior to environmental exposure is shown in FIG. 2. The panels were then placed horizontally under a canopy of mango trees in Dade County, Fla. Coatings were measured using ASTM D3274 where a "10" rating indicates no mold growth and a "0" rating indicates complete overgrowth. The results after ten weeks of exposure are shown in FIG. 3.

Figure 3:
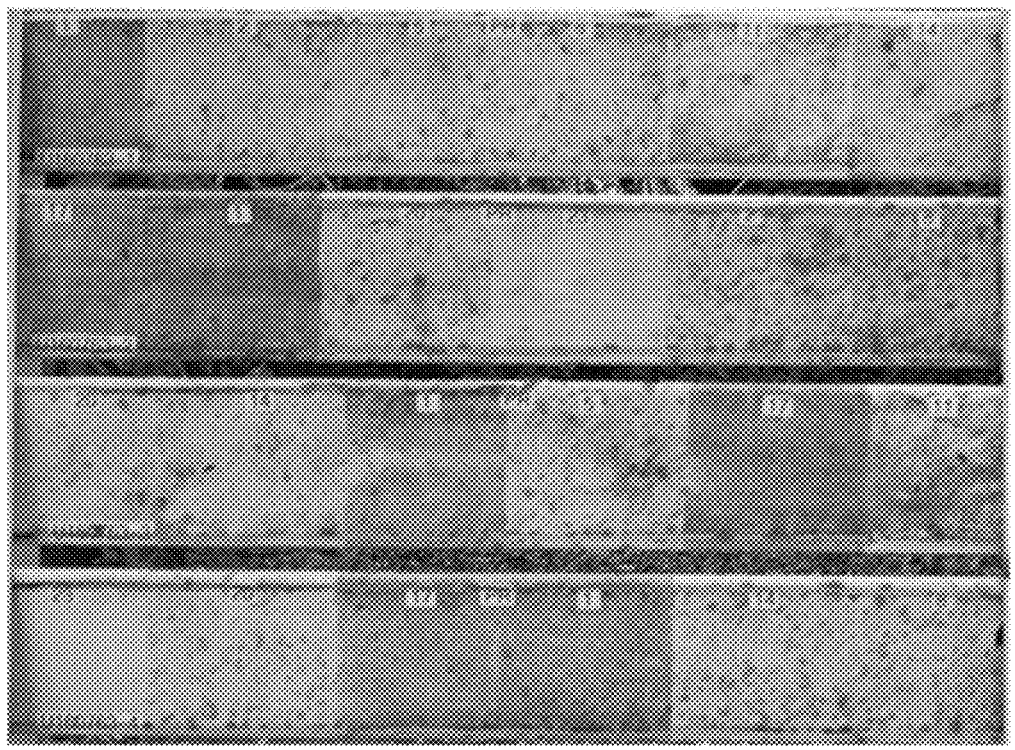
FIG. 3 illustrates a photograph of all the panels of the roof coating system of FIG. 2 after ten weeks of exposure under a canopy of mango trees in Dade County Fla.

The most effective dry film preservative was the combination of 1% POLYPHASE® 663 with 1.5% TROYSAN® 1050, which is a combination of immobilized BIT/zinc oxide complex and a dry film preservative according to the invention (see coating number 23 of FIG. 3). FIG. 3 also includes paints containing commercial dry film preservatives for roof coatings, such as ACTICIDE® MKW2 (see coating number 11 of FIG. 3). Paint with no dry film preservative was completely overgrown (see coatings number 1 of FIG. 3). The paint containing POLYPHASE® 663 (see coating number 2 of FIG. 3), while better than the blank, was inferior to the paint coating containing the blend of 1% POLYPHASE® 663 with 1.5% TROYSAN® 1050.

Example 3: Reduction in Fungal Defacement of a Painted Surface with Inclusion of Immobilized BIT Control of bacterial growth is not considered an important endpoint in control of mildew or algae growth. While not intending to be limited by any one theory, the inventors thought bacterial growth may be indirectly influencing the ability of a dry film preservative to control mildew and/or algae defacement of a surface. To test this hypothesis, a repeat of the test performed in Example 1 was performed but the samples were first exposed for 24 hours to a bacterial culture containing a mixture of laboratory and environmental strains of bacteria.

The paint films were prepared as described in Example 1, and an additional sample (Sample 4) containing the inventive preservative, i.e. immobilized BIT/zinc oxide complex together with IPBC, BCM and Diuron as dry film preservative was also prepared. The bacterial mixture was *Enterobacter cloacae* and *Actinobacter* sp. (environmental isolates from a contaminated elastomeric roof coating in Puerto Rico), and *Pseudomonas aeruginosa* (ATCC #10145). Each strain was grown for 18-24 hours in Nutrient Broth, then diluted to approximately $1 \times 10^8$ CFU/mL with 1× Butterfield's Phosphate Buffer (pH=7.2) by optical density (OD600) measurements. After dilution, equal volumes of each strain were combined to form a 3 bacterial mixture. Before mildew resistance evaluation, films were exposed to bacteria by applying 0.1 ml of the bacterial suspension to the surface of each paint film and incubating each film individually for 18-24 hrs. at 33-37° C. in a 100×15 mm sterile petri dish. Control (unexposed) films were incubated with 0.1 ml of sterile 1× Butterfield's Phosphate Buffer. After incubation, all films were dry. The weathered and control films were then placed in petri dishes containing solidified Malt Agar containing antibiotics (50 µg/mL of each Penicillin G, Streptomycin, and Neomycin) to inhibit further bacterial growth on the plate, and then top inoculated with 0.2 mL of a suspension of *Aspergillus niger*, which was spread evenly over the surface the coating specimen and agar plate with a sterile L-spreader. Approximately $5 \times 10^5$ colony forming units of this organism were applied to the plate. The petri dishes were incubated for a period of 4 weeks at 28° C.

As shown in FIG. 4, Sample 2 containing only POLYPHASE® 663 (i.e. dry film preservatives IPBC, BCM and Diuron) lost significant antifungal performance after bacterial exposure, but Sample 4 containing both TROYSAN® 1050 and POLYPHASE® 663 retained mildew resistance after bacterial exposure. As before, Troysan® 1050 alone (i.e. immobilized BIT/zinc oxide complex) did not control dry-film mildew growth. Sample 4 demonstrates clearly that the combination of immobilized BIT/zinc oxide complex and a dry film preservative retains efficacy against fungus in the presence of bacteria, while the dry film preservative alone (Sample 2) is not effective. These results suggest that surprisingly, inclusion of a bactericide delays surface defacement from fungus and/or algae better than a dry film preservative alone, even though the immobilized BIT/zinc oxide complex has been demonstrated to not be effective against defacement of surfaces exposed to the environment on its own. Therefore, while immobilized BIT/zinc oxide complex, is itself ineffective against algae and fungus and is not considered in the art to be useful as a dry film preservative, it surprisingly serves to enhance the efficacy of conventional dry film preservatives against algae and/or fungus. Thus, the results in FIG. 4 clearly establish that coating compositions according to exemplary embodiments of the invention provided a synergistic effect in preventing defacement of surfaces exposed to the environment by inhibiting growth of fungus and/or algae.

While the invention has been illustrated by reference to specific embodiments, the invention is not intended to be limited to the details shown. Those skilled in the art will understand that variations and modifications may be made in the details within the scope and range of equivalents of the claims and without departing from the invention. Thus, the invention is intended not to be limited by the foregoing description, but to be defined by the appended claims and their equivalents.

What is claimed is:

1. A dry-film preservative composition useful against fungus and/or algae, the composition comprising:
   a) at least one bactericide comprising an immobilized isothiazolin-3-one derivative/zinc oxide complex;
   b) at least one dry film preservative useful against fungus, or useful against algae, or useful against fungus and algae,
   wherein the weight ratio of a):b) is from 1:25 to 25:1, limits inclusive.

2. The composition according to claim 1, wherein the immobilized isothiazolin-3-one derivative/zinc oxide complex is selected from the group consisting of immobilized 1,2-benzisothiazolin-3(2H)-one (BIT)/zinc oxide complex; immobilized N-(n-butyl)-1,2-benzisothiazolin-3-one (BB1T)/zinc oxide complex; immobilized 2-methyl-4-isothiazolin-3-one (MIT)/zinc oxide complex; immobilized 5-chloro-2-methyl-4-isothiazolin-3-one (CMIT)/zinc oxide complex; immobilized 2-octyl-2H-isothiazol-3-one (OIT)/zinc oxide complex; immobilized 4,5-dichloro-2-octyl-4-isothiazolin-3-one (DCOIT)/zinc oxide complex; and mixtures thereof.

3. The composition according to claim 1 wherein the dry film preservative b) is selected from the group consisting of: 3-iodoprop-2-yn-1-yl butylcarbamate (IPBC); methylbenzimidazole-2-yl carbamate (BCM); 3-(3,4-dichlorphenyl)-1,1-dimethylurea (Diuron); 2-tert-butylamino-4-ethylamino-6-methylthio-1,3,5-triazin (Terbutryn); 3-(4-isopropylphenyl)-1,1-dimethylurea (Isoproturon); zinc pyrithione (ZPT); 2-(tert-butylamino)-4-(cyclopropylamino)-6-(methylthio)-s-triazine (Irgarol); N-tert-butyl-6-chloro-N'-ethyl-1,3,5-triazine-2,4-diamine (Terbuthylazine); and mixtures thereof.

4. The composition according to claim 2 wherein the dry film preservative b) is selected from the group consisting of 3-iodoprop-2-yn-1-yl butylcarbamate (IPBC); methylbenzimidazole-2-yl carbamate (BCM); 3-(3,4-dichlorphenyl)-1,1-dimethylurea (Diuron); 2-tert-butylamino-4-ethylamino-6-methylthio-1,3,5-triazin (Terbutryn); 3-(4-isopropylphenyl)-1,1-dimethylurea (Isoproturon); zinc pyrithione (ZPT); 2-octyl-2H-isothiazol-3-one (OIT); 4,5-dichloro-2-octyl-4-isothiazolin-3-one (DCOIT); 2-(tert-butylamino)-4-(cyclopropylamino)-6-(methylthio)-s-triazine (Irgarol); N-tert-butyl-6-chloro-N'-ethyl-1,3,5-triazine-2,4-diamine (Terbuthylazine); and mixtures thereof.

5. The composition according to claim 1, wherein the immobilized isothiazolin-3-one derivative/zinc oxide complex is 1,2-benzisothiazolin-3(2H)-one (BIT)/zinc oxide complex.

6. The composition according to claim 2, wherein the immobilized isothiazolin-3-one derivative/zinc oxide complex is immobilized 1,2-benzisothiazolin-3(2H)-one (BIT)/zinc oxide complex.

7. The composition according to claim 5, wherein the immobilized isothiazolin-3-one derivative/zinc oxide complex is immobilized 1,2-benzisothiazolin-3-one (BIT)/zinc oxide complex.

8. The composition according to claim 7, wherein the dry film preservative b) is selected from the group consisting of: 3-(3,4-dichlorphenyl)-1,1-dimethylurea (Diuron); 2-tert-Butylamino-4-ethylamino-6-methylthio-1,3,5-triazin (Terbutryn); 3-(4-isopropylphenyl)-1,1-dimethylurea (Isoproturon); 2-(tert-Butylamino)-4-(cyclopropylamino)-6-(methylthio)-s-triazine (Irgarol); N-tert-butyl-6-chloro-N'-ethyl-1,3,5-triazine-2,4-diamine (Terbuthylazine); and mixtures thereof.

9. The composition according to claim 8, wherein b) is 3-(3,4-dichlorphenyl)-1,1-dimethylurea (Diuron).

10. The composition according to claim 1, wherein the weight ratio of a):b) is from 1:4 to 4:1, limits inclusive.

11. A coating composition comprising the composition according to claim 1 and a carrier, wherein the immobilized 1,2-benzisothiazolin-3(2H)-one/zinc oxide complex has a total mass of 0.001% to 10% weight percent of the coating composition.

12. A method of protecting a substrate from defacement when exposed to an environment, wherein the method comprises the steps of:
 i) treating the substrate with the coating composition according to claim 11;
 ii) allowing the coating composition to harden, forming a dry film.

13. The method according to claim 12, wherein the environment comprises a microbial infestation.

14. The method according to claim 13, wherein the microbial infestation is selected from the group consisting of fungal growth, algal growth, bacterial growth, and combinations thereof.

15. The method according to claim 12 wherein the coating composition is selected from the group consisting of paint, leather treatment, roof coating, mastic, adhesive, spackling compound, or stain.

16. The method according to claim 12 wherein the substrate is selected from the group consisting of wood, fresh sawn timber, stucco, concrete, wall board, leather, ceramic, stone, brick, plastic, leather, paper, metal, flexible PVC, pool liners, and fabric.

17. The method according to claim 12 wherein the substrate is an exterior surface.

18. The method according to claim 17 wherein the exterior surface is horizontal.

19. The coating composition according to claim 11, wherein the immobilized 1,2-benzisothiazolin-3(2H)-one/zinc oxide complex has a total mass of 0.005% to 5% weight percent of the coating composition.

* * * * *